(12) United States Patent
Nakahama et al.

(10) Patent No.: US 8,177,902 B2
(45) Date of Patent: *May 15, 2012

(54) METHOD FOR PRODUCING LIQUID COMPOSITION AND PIGMENT PARTICLES AND INK COMPOSITION FOR INK JET RECORDING

(75) Inventors: Kazumichi Nakahama, Tokyo (JP); Takayuki Teshima, Yokohama (JP); Yukio Hanyu, Isehara (JP); Ryuji Higashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.
This patent is subject to a terminal disclaimer.

(21) Appl. No.: 13/036,115

(22) Filed: Feb. 28, 2011

(65) Prior Publication Data
US 2011/0146533 A1   Jun. 23, 2011

Related U.S. Application Data

(62) Division of application No. 11/680,208, filed on Feb. 28, 2007, now Pat. No. 7,914,616.

(30) Foreign Application Priority Data

Mar. 14, 2006   (JP) .................................. 2006-070003

(51) Int. Cl.
*C08K 5/00* (2006.01)
(52) U.S. Cl. ........................................ 106/493; 106/494
(58) Field of Classification Search .................. 106/493, 106/494
See application file for complete search history.

(56) References Cited

U.S. PATENT DOCUMENTS

| | | |
|---|---|---|
| 5,928,419 A | 7/1999 | Uemura et al. |
| 6,451,103 B1 | 9/2002 | Uemura et al. |
| 7,914,616 B2 | 3/2011 | Nakahama et al. |
| 2005/0131102 A1 | 6/2005 | Nakazawa et al. |
| 2005/0197424 A1 | 9/2005 | Higashi et al. |
| 2005/0239918 A1 | 10/2005 | Nakazawa et al. |
| 2005/0249925 A1 | 11/2005 | Ikegami et al. |
| 2006/0004124 A1 | 1/2006 | Tsubaki et al. |
| 2006/0047015 A1 | 3/2006 | Duda et al. |
| 2006/0076298 A1 | 4/2006 | Nakanishi et al. |
| 2006/0100310 A1 | 5/2006 | Nakazawa et al. |
| 2006/0128828 A1 | 6/2006 | Sato et al. |
| 2006/0144287 A1 | 7/2006 | Tsubaki et al. |
| 2006/0146087 A1 | 7/2006 | Sato et al. |
| 2006/0160975 A1 | 7/2006 | Suda et al. |
| 2006/0178468 A1 | 8/2006 | Sato et al. |

(Continued)

FOREIGN PATENT DOCUMENTS

JP   61-185568 A   8/1986

(Continued)

*Primary Examiner* — Jerry Lorengo
*Assistant Examiner* — Veronica F Faison (74) *Attorney, Agent, or Firm* — Fitzpatrick, Cella, Harper & Scinto (57) ABSTRACT

A method for producing a liquid composition containing pigment particles is provided including (1) maintaining a mixture of a solvent and pigments of at least two types including a pigment A insoluble in the solvent at a normal temperature and a normal pressure, and a pigment B soluble in the solvent at the normal temperature and the normal pressure, at a temperature exceeding the normal temperature and a pressure exceeding the normal pressure, thereby obtaining a pigment solution in which the pigment A and the pigment B are dissolved; and (2) cooling the pigment solution to a temperature precipitating a deposition of the pigment A or lower, thereby precipitating pigment particles containing the pigment A and the pigment B.

6 Claims, 4 Drawing Sheets

U.S. PATENT DOCUMENTS

| | | |
|---|---|---|
| 2006/0221117 A1 | 10/2006 | Sato et al. |
| 2006/0235177 A1 | 10/2006 | Ikegami et al. |
| 2007/0015856 A1 | 1/2007 | Sato et al. |
| 2007/0119336 A1 | 5/2007 | Nakahama et al. |
| 2007/0149651 A1 | 6/2007 | Teshima et al. |
| 2007/0283847 A1 | 12/2007 | Nakahama et al. |
| 2007/0285458 A1 | 12/2007 | Nakahama et al. |
| 2009/0311425 A1 | 12/2009 | Tsubaki et al. |

FOREIGN PATENT DOCUMENTS

| | | |
|---|---|---|
| JP | 6-96679 B2 | 11/1994 |
| JP | 10-110111 A | 4/1998 |
| JP | 2004-091560 A | 3/2004 |

METHOD FOR PRODUCING LIQUID COMPOSITION AND PIGMENT PARTICLES AND INK COMPOSITION FOR INK JET RECORDING

This application is a division of application Ser. No. 11/680,208, now U.S. Pat. No. 7,914,616, filed Feb. 28, 2007.

BACKGROUND OF THE INVENTION

1. Field of the Invention

The present invention relates to a method for producing a liquid composition containing pigment particles, a method for producing pigment particles, and an ink composition for ink jet recording, containing the liquid composition produced by the producing method.

2. Description of the Related Art

Recent years, digital printing technology is remarkably progressing.

The digital printing technology typified by electrophotographic technology and ink jet technology is increasingly important as image forming technology in offices and for home use.

In the field of electrophotographic technology, attention is being attracted to an electrophotographic photosensitive member utilizing an organic photoconductive substance (hereinafter referred to as an organic photosensitive member).

The organic photosensitive member has advantages such that it has a satisfactory film forming property and can be produced by a coating process, has an extremely high productivity and can be produced at a low cost, and that the sensitivity can be arbitrarily controlled by the selection of an organic pigment to be used as a sensitizer.

Most of the organic photosensitive members are composed of at least two layers, a charge generation layer and a charge transport layer, in which carriers generated by light in the charge generation layer are injected into the charge transport layer to neutralize charges on the surface of the photosensitive member, thereby generating an electrostatic image.

Electrophotographic characteristics such as image characteristics depend significantly on the charge generation layer, and the magnitude of carrier generation, the uniformity of carrier generation and how to efficiently inject the generated carriers into the charge transport layer become key factors in the development of the organic photosensitive member.

It is already known that the characteristics of the charge generation layer are influenced, in general, by the particle size of an organic pigment serving as a charge generation substance.

A smaller particle size is considered to provide satisfactory electrophotographic characteristics, as it increases a charge generating efficiency by a surface area effect and allows a uniform and smooth charge generation layer to be formed.

On the other hand, also in the field of ink jet technology, the image forming characteristics are considered to be influenced by the particle size of an organic pigment.

As an example of the ink jet technology, there is known a method of heating an ink supplied from an ink tank, by a heater provided in a nozzle, thereby causing evaporation and forming a bubble, to discharge the ink to form an image on a recording medium.

As another example, there is known a method of causing a vibration in a piezo element, thereby discharging an ink from the nozzle.

These methods have utilized an ink based on a water-soluble dye, but such ink involves problems such as bleeding or feathering and low weather resistance, and a pigment-based ink is therefore being investigated in order to solve these problems.

However, the pigment-based ink is often inferior to the dye-based ink, for example in a storage stability over a prolonged period and in a stability of discharge from an ink jet head.

Also it causes scattering or reflection of light by pigment particles, so that an image formed from the pigment-based ink is liable to be inferior in a color developing property to the dye-based ink.

In such a situation, attention is being attracted to making the organic pigment particle size smaller as a method for improving the color developing property of the pigment-based ink.

A pigment having a small particle size of 100 nm or less (hereinafter referred to as fine pigment particles) is considered to provide a color developing property comparable to that of a dye because of little influence on light scattering and an increase in the specific surface area.

For reducing the particle size of an organic pigment, mechanical methods utilizing a dispersing equipment such as a sand mill, a roll mill or a ball mill are commonly utilized.

It is all such methods can do to reduce the pigment particle size to around a primary particle size (about 100 nm).

When a further smaller particle size is necessary, preparation thereof requires a significant amount of time and costs, and a product of uniform quality is difficult to obtain in a stable manner (cf. Japanese Patent Application Laid-open No. H10-110111).

On the other hand, Japanese Patent Publication No. H06-096679 and Japanese Patent Application Laid-open No. 2004-091560 propose a method for producing fine pigment particles by dissolving an organic pigment in a solvent, and mixing the solution of the organic solvent with a poor solvent for the organic pigment, thereby resulting in re-precipitation (hereinafter called a re-precipitation process).

However, in order to produce fine pigment particles of a nanometer size by the re-precipitation process, it is necessary to include a dispersant in an excessive amount in the system, so that the fine pigment particles obtained by this process have a large amount of dispersant adsorbed on their surfaces.

When the fine pigment particles, made into a small particle size by the re-precipitation process are used in a charge generation layer of an electrophotographic photosensitive member, the dispersant contained as an impurity together with the fine pigment particles reduces the charge generating efficiency of the charge generation layer, and also leads to deterioration in the electrophotographic characteristics when repeatedly used.

When such fine pigment particles are used in a pigment-based ink, since a large amount of dispersant is contained together with the fine pigment particles in the ink, a degree of freedom of formulation may decrease and discharge characteristics may deteriorate due to an increase in the viscosity.

The aforementioned prior method for producing fine pigment particles utilizes a dispersant for the purpose of dispersing a pigment, but such a dispersant developing no color becomes an impurity when contained in the ink.

It is therefore desired to provide a method for producing a liquid composition containing fine pigment particles having a small particle size, high uniformity in size and satisfactory dispersion stability, without utilizing a dispersant that may become an impurity.

SUMMARY OF THE INVENTION

In a method for producing a liquid composition provided by the present invention, a first embodiment is a method for producing a liquid composition containing pigment particles, the method including:

(1) maintaining a mixture of a solvent and pigments of at least two types including a pigment A insoluble in the solvent at a normal temperature and a normal pressure (wherein the normal temperature means 25±15° C. and the normal pressure means $1.01325 \times 10^5 \pm 0.01333 \times 10^5$ Pa) and a pigment B soluble in the solvent at the normal temperature and the normal pressure, at a temperature exceeding the normal temperature and a pressure exceeding the normal pressure, thereby obtaining a pigment solution in which the pigment A and the pigment B are dissolved; and (2) cooling the pigment solution to a temperature precipitating the pigment A or lower, thereby precipitating pigment particles containing the pigment A and the pigment B.

In a method for producing a liquid composition provided by the present invention, a second embodiment is a method for producing a liquid composition containing pigment particles, the method including:

(1) maintaining a mixture of a solvent and a pigment A insoluble in the solvent at a normal temperature and a normal pressure (wherein the normal temperature refers to 25±15° C. and the normal pressure means $1.01325 \times 10^5 \pm 0.01333 \times 10^5$ Pa) at a temperature exceeding the normal temperature and a pressure exceeding the normal pressure, thereby obtaining a pigment solution A in which the pigment A is dissolved, (2) dissolving a pigment B soluble in the solvent at the normal temperature and the normal pressure in the solvent, thereby obtaining a pigment solution B, and (3) contacting the pigment solution A and the pigment solution B, thereby precipitating pigment particles containing the pigment A and the pigment B.

The present invention also includes a method for producing pigment particles.

The producing method for pigment particles of the present invention is characterized in including removal of the solvent from a liquid composition containing pigment particles produced by the method of the present invention. An ink jet recording ink composition of the present invention is characterized in containing the liquid composition produced by the method of the present invention.

Further features of the present invention will become apparent from the following description of exemplary embodiments, with reference to the accompanying drawings.

DESCRIPTION OF THE EMBODIMENTS

In the following, the present invention will be described in detail. A first aspect of the present invention is a method for producing a liquid composition containing pigment particles, the method including:

(1) maintaining a mixture of a solvent and pigments of at least two types including a pigment A insoluble in the solvent at a normal temperature and a normal pressure, a pigment B soluble in the solvent at the normal temperature and the normal pressure, at a temperature exceeding the normal temperature and a pressure exceeding the normal pressure, thereby obtaining a pigment solution in which the pigment A and the pigment B are dissolved; and (2) cooling the pigment solution to a temperature precipitating the pigment A or lower, thereby precipitating pigment particles containing the pigment A and the pigment B.

A second aspect of the present invention is a method for producing a liquid composition containing pigment particles, the method including:

(1) maintaining a mixture of a solvent and a pigment A insoluble in a solvent at a normal temperature and a normal pressure, at a temperature exceeding the normal temperature and a pressure exceeding the normal pressure, thereby obtaining a pigment solution A in which the pigment A is dissolved, (2) dissolving a pigment B soluble in the solvent at the normal temperature and the normal pressure in the solvent, thereby obtaining a pigment solution B, and (3) contacting the pigment solution A and the pigment solution B, thereby precipitating pigment particles containing the pigment A and the pigment B.

The above first and second aspects enable a liquid composition containing pigment particles having a satisfactory dispersion stability to be obtained without utilizing a dispersant that may become an impurity.

The normal temperature in the present invention refers to a temperature range not exceeding an external temperature in daily life, and specifically means a range of 25±15° C. The normal pressure refers to a pressure range not exceeding an external atmospheric pressure in daily life, and specifically means a range of $1.01325 \times 10^5 \pm 0.01333 \times 10^5$ Pa.

Figure 1:
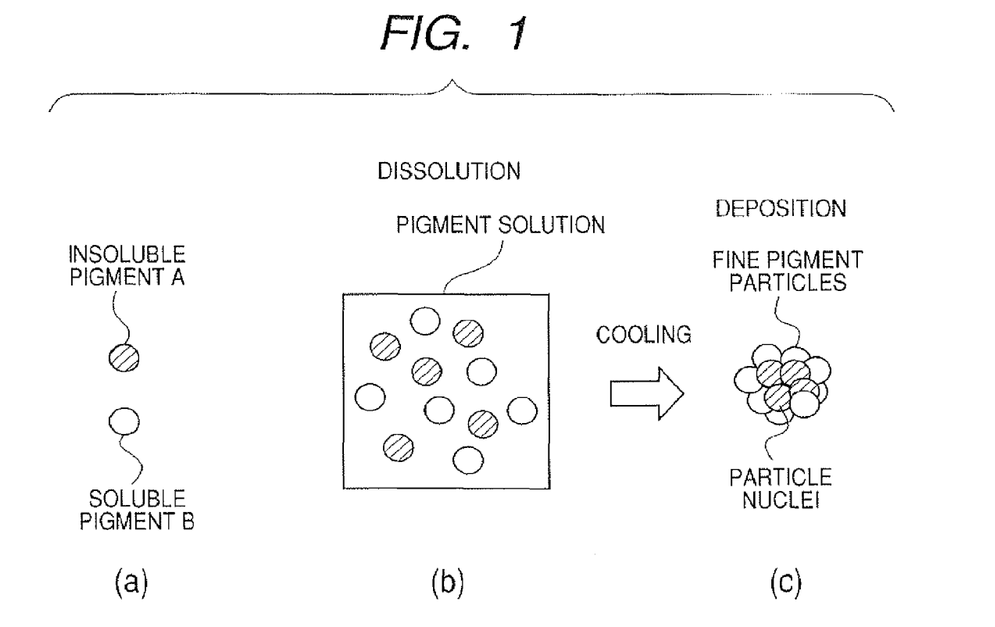
FIG. 1 is a schematic view illustrating an exemplary embodiment of a method for producing a liquid composition containing fine pigment particles of the present invention.

At first, the outline of the method for producing a liquid composition containing pigment particles, constituting the first aspect of the present invention, will be described with reference to the attached drawing.

FIG. 1 is a schematic view illustrating the method for producing a liquid composition containing pigment particles of the present invention.

A pigment A, which is insoluble in a solvent at the normal temperature and the normal pressure, and a pigment B, which is soluble in the solvent at the normal temperature and the normal pressure, are prepared ((a) of FIG. 1).

A mixture of the pigments A and B and the solvent is maintained at a temperature exceeding the normal temperature and a pressure exceeding the normal pressure to dissolve the pigments A and B, thereby obtaining a pigment solution ((b) of FIG. 1).

When the pigment solution is cooled to a temperature at which the pigment A precipitates, or lower, the insoluble pigment A forms particle nuclei, and, in the course of agglomeration of the pigment, the soluble pigment B is adsorbed on the precipitated particle nuclei to precipitate fine pigment particles, thereby obtaining fine pigment particles having dispersion stability ((c) of FIG. 1).

The outline of the method for producing a liquid composition containing pigment particles, constituting the second aspect of the present invention, will be described.

Figure 2:
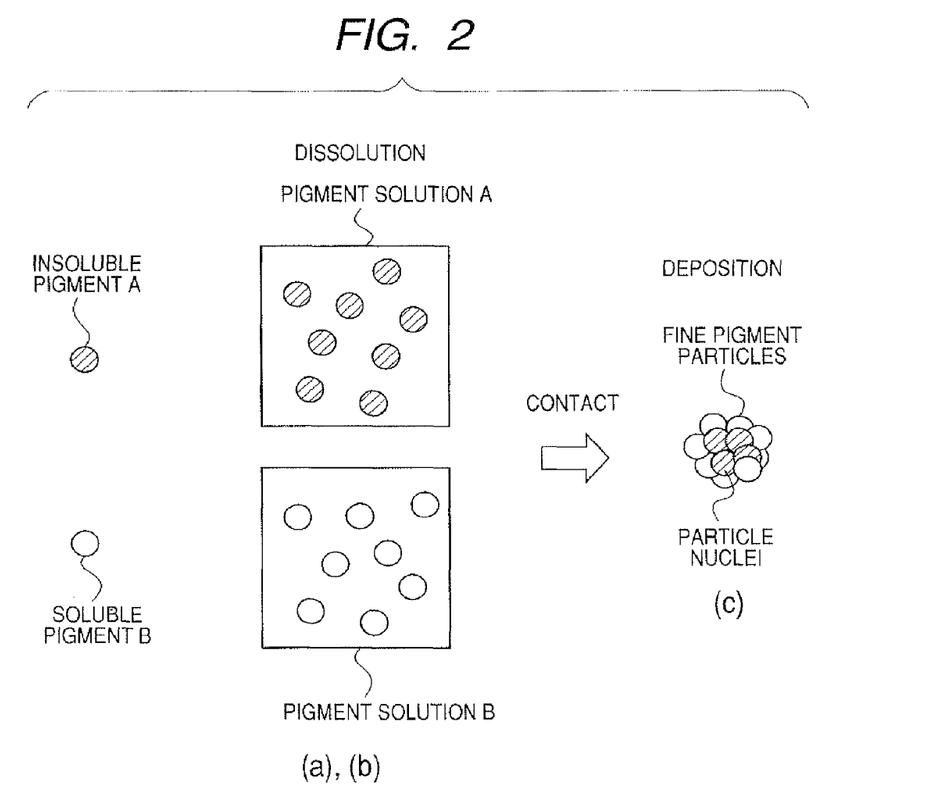
FIG. 2 is a schematic view illustrating another exemplary embodiment of a method for producing a liquid composition containing fine pigment particles of the present invention.

(a), (b) and (c) of FIG. 2 is a schematic view illustrating the method for producing a liquid composition containing pigment particles of the present invention.

A mixture of a solvent and a pigment A, which is insoluble in a solvent at a normal temperature and a normal pressure, is maintained at a temperature exceeding the normal temperature and a pressure exceeding the normal pressure to prepare a pigment solution A in which the pigment A is dissolved ((a) of FIG. 2).

Separately, a pigment B, which is soluble in the solvent at the normal temperature and the normal pressure, is dissolved in the solvent to prepare a pigment solution B ((b) of FIG. 2).

The pigment solution A and the pigment solution B are brought into contact with each other, whereby the insoluble pigment A forms particle nuclei, and, in the course of agglomeration of the pigment, the soluble pigment B is adsorbed on the deposited particle nuclei to precipitate fine pigment particles, thereby obtaining fine pigment particles having dispersion stability ((c) of FIG. 2).

The definitions of "soluble" and "insoluble" in the present invention will be described below.

A solubility parameter (SP value) is known as an index indicating a solubility of a substance in a solvent.

The SP value is a physical value defined as $(\Delta E^v/V)^{1/2}$ wherein $\Delta E^v$ is molar evaporation energy, and V is a molar volume. The SP value can be determined by a calculation from a chemical formulation, also by a calculation from heat of evaporation, from a refractive index or from surface tension.

As the difference between the SP values of the solvent and the substance is smaller, the solubility is higher.

However, attention should be paid to the fact that the discussion of solubility according to the SP value has its limits.

For example, in the case of a solvent having a large polarity such as water, the estimation of the solubility from the SP value is not appropriate, and experimental evaluation is essential.

For this reason, the solubility of a pigment in a solvent in the present invention is evaluated on the basis of such a solubility test as described below.

A pigment and a solvent is mixed in such a manner that the pigment has a concentration of 3% by mass, and the resulting mixture is shaken at 25° C. for 24 hours and then is left stand for 24 hours.

Thereafter, a state where the mixture remains in a uniform state is defined as soluble; a state where the mixture remains in an incomplete dissolution state showing a gel-like or granular appearance or evident turbidity is defined as partially soluble; and a state where the pigment and the solvent are in the so-called insoluble state without interacting with each other, is defined as insoluble.

The expression "soluble" as used in the present invention means to include "soluble" and "partially soluble" states.

Then, the definitions of the temperature and the pressure in the present invention will be described.

In the first aspect of the present invention, a pigment insoluble in a solvent at the normal temperature and the normal pressure is dissolved in the solvent.

For this purpose, a mixture including at least a pigment A insoluble in the solvent, at least a pigment B soluble in the solvent and the solvent is maintained at a temperature exceeding the normal temperature (hereinafter referred to as a high temperature) and a pressure exceeding the normal pressure (hereinafter referred to as a high pressure).

The normal temperature means a temperature in a range of 25±15° C. The normal pressure means a pressure in a range of $1.01325 \times 10^5 \pm 0.01333 \times 10^5$ Pa.

The temperature (high temperature) exceeding the normal temperature means a temperature equal to or higher than 40° C., and the pressure (high pressure) exceeding the normal pressure means a pressure equal to or higher than $1.02658 \times 10^5$ Pa.

In order to effectively carry out the present invention, the mixture of the pigments and the solvent is preferably maintained under the sub-critical or super-critical condition satisfying at least one of the condition that the density of the solvent is 2.5 times or less the density at a critical point and the condition that the density of the solvent is 0.8 times or less the density at the normal temperature and the normal pressure.

In the second aspect of the present invention, in order to dissolve in a solvent a pigment insoluble in the solvent at the normal temperature and the normal pressure, a mixture of the pigment insoluble in the solvent and the solvent is maintained in a state of a high temperature and a high pressure. The high temperature and the high pressure are as defined in the above.

The mechanisms of forming the fine pigment particles in the present invention will be described.

In the first place, the mechanism of forming the fine pigment particles in the first aspect of the present invention will be described.

A mixture of at least a pigment A insoluble in a solvent at the normal temperature and the normal pressure, at least a pigment B soluble in the solvent at the normal temperature and the normal pressure, and the solvent, is maintained in a state of a high temperature and a high pressure, to dissolve the pigment A insoluble in the solvent at the normal temperature and the normal pressure, thereby obtaining a mixed solution.

When the mixed solution is cooled, the pigment A which is in a dissolved state and is insoluble in the solvent at the normal temperature and the normal pressure, is rapidly insolubilized to form particle nuclei. Then, while the particle nuclei agglomerate to form fine pigment particles, the pigment which is soluble in the solvent at the normal temperature and the normal pressure is adsorbed on or taken into the surface of the fine pigment particles, thereby providing the fine pigment particles with dispersion stability.

Therefore, the fine pigment particle formed in the first aspect of the present invention, is characterized in that the pigment A which is insoluble in the solvent at the normal temperature and the normal pressure, is present preferentially in the proximity of the center of the fine pigment particle, and the pigment B which is soluble in the solvent at the normal temperature and the normal pressure, is present preferentially in the proximity of the surface.

Next, the mechanism for forming the fine pigment particles in the second aspect of the present invention will be described.

A mixture of at least a pigment A which is insoluble in a solvent at the normal temperature and the normal pressure, and the solvent is maintained in a state of a high temperature and a high pressure to dissolve in the solvent the pigment A which is insoluble in the solvent at the normal temperature and the normal pressure, thereby obtaining a pigment solution A.

On the other hand, a pigment solution B is obtained from at least a pigment B which is soluble in the solvent at the normal temperature and the normal pressure, and the solvent.

When the pigment solution A and the pigment solution B come into contact with each other and is cooled, the pigment A which is in a dissolved state and insoluble in the solvent at the normal temperature and the normal pressure, is rapidly insolubilized to form particle nuclei.

Then, while the particle nuclei agglomerate to form fine pigment particles, the pigment B which is soluble in the solvent at the normal temperature and the normal pressure is adsorbed on or taken into the surface of the fine pigment particles, thereby providing the fine pigment particles with dispersion stability.

Therefore, the fine pigment particle formed in the second aspect of the present invention, is characterized in that the pigment A which is insoluble in the solvent at the normal temperature and the normal pressure, is present preferentially in the proximity of the center of the fine pigment particle, and the pigment B which is soluble in the solvent and in the second solvent at the normal temperature and the normal pressure, is present preferentially in the proximity of the surface.

In order to maintain the mixture in the state of a high temperature and a high pressure, a method of heating the interior of a container in a pressurized state with a heater, may be employed. As another method, local heating by a microwave is also available.

However, in the present invention, the method of maintaining the mixture of the pigments and solvent in the state of a high temperature and a high pressure is not limited to these methods, but any known methods may be adopted inasmuch as the present invention can be satisfactorily carried out.

Next, the method of cooling the mixed solution in the first aspect of the present invention will be described.

After the mixture of the pigments and solvent is maintained in the state of a high temperature and a high pressure to form a mixed solution, such a mixed solution is cooled for the purpose of re-precipitating fine pigment particles. The cooling temperature may be any temperature equal to or lower than a temperature at which the pigment A precipitates, as long as the present invention can be carried out.

For cooling the mixed solution, spontaneous cooling may be used.

As another method, artificial cooling utilizing a temperature controlling apparatus such as a thermostat or a cooler, may also be used.

As still another method, the mixed solution may be cooled by contacting the mixed solution with a liquid having a temperature lower than that of the mixed solution.

When the pigment B, which is soluble in the solvent at the normal temperature and the normal pressure, has compatibility with such a liquid, the pigment B may be contained in such a liquid. In addition, the solvent and the above liquid may be identical to or different from each other.

However, in the first aspect of the present invention, the method of cooling the mixed solution is not limited to these methods, but any known methods may be adopted inasmuch as the present invention can be satisfactorily carried out.

Next, the method of cooling the mixed solution in the second aspect of the present invention, will be described.

The mixture of the pigment A which is insoluble in the solvent at the normal temperature and the normal pressure, and the solvent, is maintained in the state of a high temperature and a high pressure to form the pigment solution A, and the pigment solution A thus formed is brought into contact with the pigment solution B containing the pigment B which is soluble in the solvent at the normal temperature and the normal pressure, and the solvent.

The pigment solution A at a high temperature and a high pressure is cooled by the pigment solution B of a lower normal temperature, thereby re-precipitating fine pigment particles. As the method of bringing the solutions into contact with each other, any known methods may be utilized as long as the objects of the present invention can be accomplished.

The pigments to be employed in the present invention will be described.

The types of pigments to be employed are not particularly restricted, and known pigments may be employed.

The following is exemplified: phthalocyanine pigments such as metal-less phthalocyanine, copper phthalocyanine, copper halide phthalocyanine, and titanyl phthalocyanine; azo pigments such as an insoluble azo pigment, a condensed azo pigment, an azo lake, and a chelate azo pigment; quinachridone pigments; isoindolinone pigments, indanthrone pigments; diketopyrrolopyrrole pigments; dioxadine pigments; perylene pigments; perynone pigments; and anthraquinone pigments.

The examples of the pigments include the following:

C.I. Pigment Yellow 1, 3, 12, 13, 14, 17, 42, 55, 62, 73, 74, 81, 83, 93, 95, 97, 108, 109, 110, 128, 130, 151, 155, 158, 139, 147, 154, 168, 173, 180, 184, 191 and 199;

C.I. Pigment Red 2, 4, 5, 22, 23, 31, 48, 53, 57, 88, 112, 122, 144, 146, 150, 166, 171, 175, 176, 177, 181, 183, 184, 185, 202, 206, 207, 208, 209, 213, 214, 220, 254, 255, 264 and 272;

C.I. Pigment Blue 16, 25, 26, 56, 57, 60, 61 and 66;

C.I. Pigment Violet 19, 23, 29, 37, 38, 42, 43 and 44;

C.I. Pigment Orange 16, 34, 35, 36, 61, 64, 66, 71 and 73; and

C.I. Pigment Brown 23 and 38.

Such pigments may be employed singly or in a combination of two or more kinds. Pigment derivatives having substituents bonded to their basic structures of the pigment may also be used inasmuch as the objects of the present invention can be accomplished.

The pigments listed above are examples of the pigment A which is insoluble in the solvent to be employed in the present invention at the normal temperature and the normal pressure. In the following, the pigment B which is soluble in the solvent will be described.

The pigment B, which is soluble in the solvent at the normal temperature and the normal pressure, is a pigment derivative having a substituent bonded to a basic structure contributing to the color development.

The substituent has a function of improving a solvent affinity of the pigment, and can preferably be such a hydrophilic substituent as typified by a carboxyl group or a sulfonic acid group.

However, the pigment of the present invention soluble in the solvent at the normal temperature and the normal pressure, is not limited to those mentioned above, and any pigments or pigment derivatives may be employed as long as the objects of the present invention can be accomplished.

Also the present invention may be effectively utilized for reducing the particle size of a metal phthalocyanine pigment which is a useful substance in the electrophotographic technology.

The pigment A which is insoluble in the solvent at the normal temperature and the normal pressure may be preferably a metal phthalocyanine pigment represented by the following general formula (1):

$$MPc-(R)_n \qquad (1)$$

wherein Pc represents a phthalocyanine ring; M represents a metal atom; R represents a substituent(s) of one type or two or more types different in their chemical structures; and n represents an integer of from 0 to 16.

Examples of the metal atom represented by M include copper, titanium, aluminum and iron.

The metal phthalocyanine pigment is a pigment having a basic structure represented by the general formula (1), and includes a metal phthalocyanine derivative in which any substituent is bonded to at least one position of from R1 to R16 and a pure metal phthalocyanine in which no substituent is bonded.

In the general formula (1), the substituent(s) may be of one type or two or more types different in their chemical structures inasmuch as the objects of the present invention can be accomplished.

The solvent B which is soluble in the solvent at the normal temperature and the normal pressure may be preferably a metal phthalocyanine pigment represented by the following general formula (2):

$$MPc-(R')_{n1} \quad (2)$$

wherein Pc represents a phthalocyanine ring; M represents a metal atom; R' represents a substituent(s) one type or two or more types different in their chemical structures, where at least one of the substituents is a hydrophilic substituent; and n1 represents an integer of from 1 to 16.

Among the metal phthalocyanine pigments, the pigment B which is soluble in the solvent at the normal temperature and the normal pressure is a pigment in which a substituent having an affinity with the solvent, is bonded at least one position of from R'1 to R'16 in the general formula (2).

The substituent(s) may be preferably such a hydrophilic substituent(s) typified by a carboxyl group or a sulfonic acid group. The substituent(s) may be of one type or two or more types different in their chemical structures inasmuch as the present invention can be accomplished.

In the following, the solvents to be employed in the present invention will be described.

The solvents may be of the same type, or of different types. The present invention can be carried out particularly advantageously when two or more solvents have compatibility with one another.

In the present invention, in order to provide the pigment particles with high dispersion stability, at least one of the solvents is preferably water or an aqueous solution containing water.

Any solvents may be employed as long as the combination thereof satisfies the above conditions.

Examples of the solvent include water; alcohols such as methanol, ethanol and 2-propanol; ketones such as acetone and methyl ethyl ketone; ethers; esters; aromatic solvents; polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethyl ether, ethylene glycol monobutyl ether, diethylene glycol monoethyl ether, and diethylene glycol monobutyl ether; and nitrogen-containing solvents such as N-methyl-2-pyrrolidone, a substituted pyrrolidone, and triethanolamine. These solvents may be employed singly or in a mixture.

The present invention can provide a method for producing a liquid composition containing fine pigment particles of a small particle size, high size uniformity, and satisfactory dispersion stability, without utilizing a dispersant that may become an impurity.

Also the present invention can provide a method for producing fine pigment particles having satisfactory dispersion stability.

Furthermore, the present invention can provide an ink composition for ink jet recording, containing the liquid composition produced by the aforementioned method.

EXAMPLES

In the following, the present invention will be further clarified by means of examples, but the present invention is not limited to such examples.

Example 1

Preparation of Fine Pigment Particles

Figure 3:
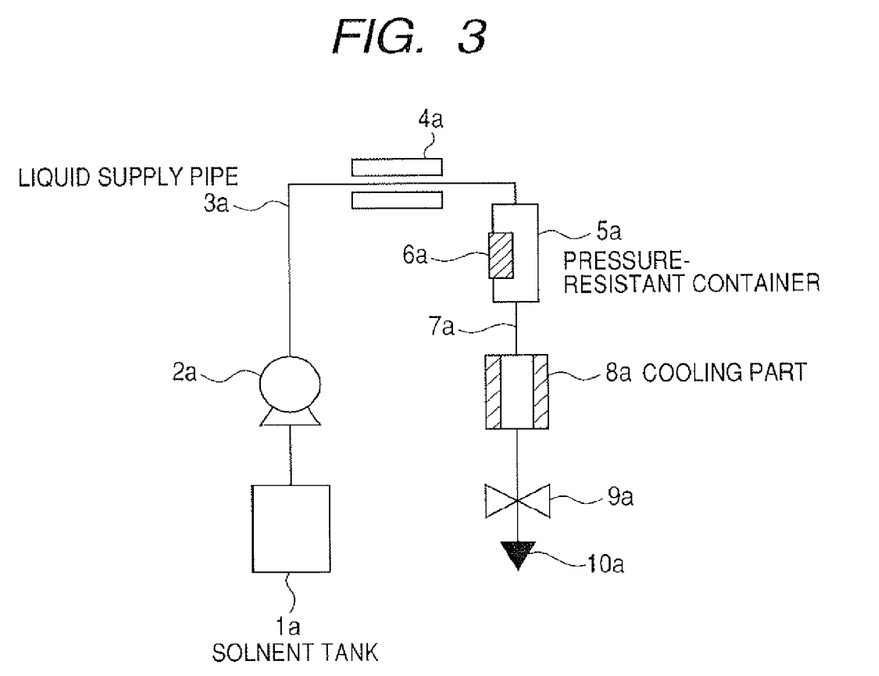
FIG. 3 is a schematic view illustrating an exemplary embodiment of a apparatus for producing a liquid composition containing fine pigment particles of the present invention.

Fine pigment particles were produced by an apparatus illustrated in FIG. 3. In FIG. 3, 1a denotes a solvent tank; 2a, a first pump; 3a, a liquid supply pipe; 4a, a preheating part; 5a, a pressure-resistance container; 6a, pigment; 7a, a pigment fluid supply tube; 8a, a cooling part; 9a, a back-pressure valve; and 10a, a collecting port.

Copper phthalocyanine and copper phthalocyanine tetrasulfonic acid [copper (II) phthalocyanine-tetrasulfonic acid] were charged in advance in the interior of a pressure-resistant container 5a.

A stainless steel filter was mounted in front of and behind the pressure-resistant container 5a, thereby preventing the pigment prior to dissolution from flowing out.

Water was supplied from a solvent tank 1a through a liquid supply pipe 3a to the pressure-resistant container 5a, to prepare a mixed solution under 25 MPa and 400° C., which was passed through the container.

Then, the mixed solution was sufficiently cooled in a cooling part 8a to the room temperature to precipitate the fine pigment particles, and the dispersion liquid was collected from a collecting port 10a.

The fine pigment particles as measured by a dynamic light scattering apparatus (DLS-7000, manufactured by Otsuka Electronics Co.), had an average particle size of 25 nm, and a particle size range of from 15 to 50 nm, thus the distribution was narrow.

As to the dispersion stability, when the dispersion liquid was left standing at the room temperature and subjected to the observation of agglomeration and precipitation of the particles, no precipitation was observed even after left standing for one month.

Preparation of Ink Composition

From the dispersion liquid of the fine pigment particles, excessive copper phthalocyanine tetrasulfonic acid [copper (II) phthalocyanine-tetrasulfonic acid] not involved in the formation of the fine pigment particles was removed with a dialysis membrane.

The dialysis membrane was Molecular Porous Membrane Tubing (MWCO: 3500), manufactured by SPECTRUM Laboratories Inc.

Then an evaporator was used to prepare a concentrated liquid having a pigment content of 10 mass %.

An ink composition was prepared by mixing 50 parts by mass of the concentrated liquid containing the fine pigment particles, 7.5 parts by mass of diethylene glycol, 5 parts by mass of glycerin, 5 parts by mass of trimethylolpropane, 0.2 parts by mass of acetylenol, and 32.3 parts by mass of ion-exchange water.

Evaluation of Ink Jet Printing

The prepared ink composition was loaded into an ink jet printer BJF800 (trade name, manufactured by Canon Inc.) and was subjected to ink jet recording of a solid image on plain paper.

The printed matter was evaluated by visual observation, and was confirmed to have a clear color hue.

In addition, the ink composition was loaded into an ink jet printer BJF800 (trade name, manufactured by Canon Inc.)

and was subjected to ink jet recording of a character image on plain paper, and the discharge stability was evaluated.

The discharge stability was evaluated by continuously printing 1,000,000 alphanumerical characters and visually inspecting the printed matter. As a result, clear printing without problems such as thin printing or discharge failure was able to be performed to the end.

Comparative Example 1

Preparation of Fine Pigment Particles Utilizing Dispersant

Fine pigment particles were produced by the apparatus illustrated in FIG. 3.

Copper phthalocyanine, copper phthalocyanine tetrasulfonic acid [copper (II) phthalocyanine-tetrasulfonic acid] and a dispersant Bridge 35 (manufactured by Kishida Chemical Co.) were charged in advance in the pressure-resistant container 5a.

Further, a stainless steel filter was mounted in front of and behind the pressure-resistant container 5a, thereby preventing the pigment prior to dissolution from flowing out. Water was supplied from the solvent tank 1a through the liquid supply pipe 3a to the pressure-resistant container 5a, to prepare a mixed solution under 25 MPa and 400° C., which was passed through the container.

Then the mixed solution was sufficiently cooled in the cooling part 8a to the room temperature to deposit the fine pigment particles, and the dispersion liquid was collected from the collecting port 10a.

The fine pigment particles as measured by a dynamic light scattering apparatus (DLS-7000, manufactured by Otsuka Electronics Co.), had an average particle size of 20 nm, and a particle size range of from 15 to 45 nm, thus the distribution was narrow.

As to the dispersion stability, when the dispersion liquid was left standing at the room temperature and subjected to the observation of agglomeration and precipitation of the particles, no precipitation was observed even after left standing for one month.

Preparation of Ink Composition

From the dispersion liquid of the fine pigment particles, excessive copper phthalocyanine tetrasulfonic acid [copper (II) phthalocyanine-tetrasulfonic acid] that was not involved in the formation of the fine pigment particles was removed with a dialysis membrane. The dialysis membrane employed was Molecular Porous Membrane Tubing (MWCO: 3500), manufactured by SPECTRUM Laboratories Inc.

Then, an evaporator was used to prepare a concentrated liquid of a pigment content of 10 mass %.

An ink composition was prepared by mixing 50 parts by mass of the concentrated liquid containing the fine pigment particles, 7.5 parts by mass of diethylene glycol, 5 parts by mass of glycerin, 5 parts by mass of trimethylolpropane, 0.2 parts by mass of acetylenol, and 32.3 parts by mass of ion-exchange water.

Evaluation of Ink Jet Printing

The prepared ink composition was loaded into an ink jet printer BJF800 (trade name, manufactured by Canon Inc.) and was subjected to ink jet recording of a solid image on plain paper.

The printed matter was evaluated by visual observation, and was confirmed to have a clear color hue.

In addition, the ink composition was loaded into an ink jet printer BJF800 (trade name, manufactured by Canon Inc.) and was subjected to ink jet recording of a character image on plain paper, and the discharge stability was evaluated.

The discharge stability was evaluated by continuously printing 1,000,000 alphanumerical characters and visually inspecting the printed matter. As a result, problems such as thin printing and discharge failure occurred, and a deficiency in the discharge stability was confirmed.

Example 2

Synthesis of Pigment

α-chloronaphthalene (manufactured by Tokyo Kasei Co.) whose moisture content was brought into 10 ppm by using a molecular sieve was mixed with 1,2,4,5-tetracyanobenzene (manufactured by Tokyo Kasei Co.), and agitated at 60° C. for 30 minutes.

Then titanium tetrachloride (manufactured by Aldrich Inc.) was added and reacted at 200° C. for 12 hours.

After the reaction liquid was cooled to 100° C., it was filtered under a reduced pressure, and the filtered substance was washed with N,N-dimethylformamide, water, diluted hydrochloric acid, water and methanol in succession in this order.

Thereafter, the filtered substance was refluxed under heating for 10 hours in an aqueous 30 mass % solution of potassium hydroxide, and then was neutralized with 0.1 N hydrochloric acid.

After the neutralization, filtration under a reduced pressure was carried out to produce a filtered substance, which was washed with water until the washing liquid becomes neutral, then washed with methanol and dried under a pressure of 100 hPa or less, obtaining the targeted titanyl phthalocyanine octacarboxylic acid.

Preparation of Fine Pigment Particles

Figure 4:
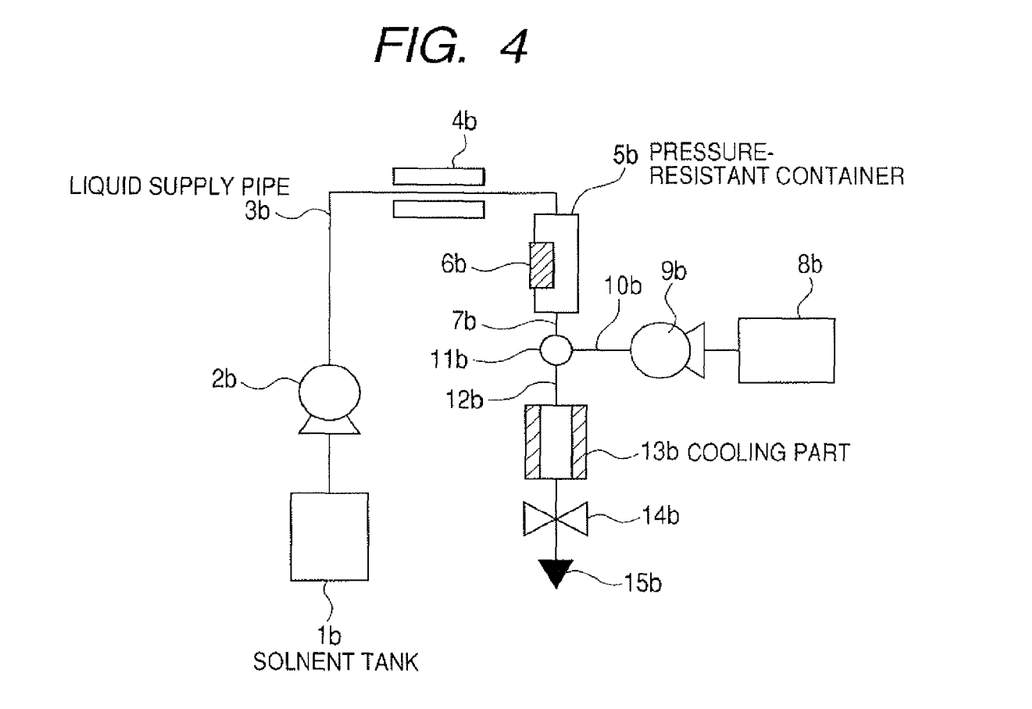
FIG. 4 is a schematic view illustrating another exemplary embodiment of a apparatus for producing a liquid composition containing fine pigment particles of the present invention.

Fine pigment particles were produced by an apparatus illustrated in FIG. 4. In FIG. 4, 1b denotes a solvent tank; 2b, a first pump; 3b, a liquid supply pipe; 4b, a preheating part; 5b, a pressure-resistant container; 6b, pigment; 7b, a pigment fluid supply pipe; 8b, a dispersant tank; 9b, a second pump; 10b, a dispersant supply pipe; 11b, a mixing part; 12b, a mixed solution supply pipe; 13b, a cooling part; 14b, back-pressure valve; and 15b, a collection port.

Titanyl phthalocyanine was charged in advance in the interior of a pressure-resistant container 5b. Further, a stainless steel filter was mounted in front of and behind the pressure-resistant container 5b, thereby preventing the pigment prior to dissolution from flowing out.

Water was supplied from a solvent tank 1b through a liquid supply pipe 3b to the pressure-resistant container 5b, and maintained in an super-critical state of 25 MPa and 400° C. to prepare a mixed solution, which was passed through the container.

Then a solution prepared by dissolving titanyl phthalocyanine octacarboxylic acid in water was supplied to a mixing part 11b and mixed with the afore-mentioned mixed liquid, thereby precipitating fine pigment particles.

The temperature after mixing was 150°. Then a cooling tube (cooling part) 13b was used to sufficiently cool the dispersion liquid of the fine pigment particles to the room temperature, and the dispersion liquid was collected from a collecting port 15b.

The fine pigment particles as measured by a dynamic light scattering apparatus (DLS-7000, manufactured by Otsuka Electronics Co.), had an average particle size of 40 nm, and a particle size range of from 25 to 65 nm, thus the distribution was narrow.

As to the dispersion stability, when the dispersion liquid was left standing at the room temperature and subjected to the observation of agglomeration and precipitation of the particles, no precipitation was observed even after left standing for one month.

Preparation of Photosensitive Member Sample

From the dispersion liquid of the fine pigment particles, excessive titanyl phthalocyanine octasulfonic acid that was not involved in the formation of the fine pigment particles was removed with a dialysis membrane, and the fine pigment particles were collected by filtration and dried.

The dialysis membrane was Molecular Porous Membrane Tubing (MWCO: 3500), manufactured by SPECTRUM Laboratories Inc.

Then an undercoat layer having a thickness of about 1 μm was applied on an aluminum-evaporated Mylar.

Further, a liquid prepared by dispersing the fine pigment particles and a butyral resin in n-butyl acetate by means of an ultrasonic dispersing machine under cooling with ice, was applied on the undercoat layer and dried to form a charge generation layer having a thickness of about 0.2 μm.

Next, a solution prepared by dissolving a triphenylamine compound and a polycarbonate resin in dichloromethane, was applied to form a charge transport layer having a thickness of about 25 μm. Through the above procedures, a sample of a function-separated photosensitive member was prepared.

Evaluation of Photoelectric Characteristics

The surface of the sample of the function-separated photosensitive member was subjected to corona charging for 20 seconds, and, after dark attenuation for 20 seconds, was exposed to monochromatic light of 780 nm, and the absolute surface potential was measured during that time period.

As a result, the surface potential after the charging for 20 seconds exceeded 990 V and was identified as sufficient for practical use. in addition, almost no charge loss was observed during the dark attenuation for 20 seconds.

Comparative Example 2

Preparation of Fine Pigment Particles Utilizing Dispersant

Fine pigment particles were produced by the apparatus illustrated in FIG. 4. Titanyl phthalocyanine was charged in advance into the pressure-resistant container 5b, and a stainless steel filter was mounted in front of and behind the pressure-resistant container 5b, thereby preventing the pigment prior to dissolution from flowing out.

Water was supplied from the solvent tank 1b through the liquid supply pipe 3b to the pressure-resistant container 5b in a super-critical state of 25 MPa and 400° C. to prepare a mixed solution, which was passed through the container.

Then a solution prepared by dissolving titanyl phthalocyanine octacarboxylic acid and Bridge 35 in water was supplied to a mixing part 11b and mixed with the afore-mentioned mixed liquid, thereby precipitating fine pigment particles. The temperature after mixing is 150° C.

The cooling tube 13b was used to sufficiently cool the dispersion liquid of the fine pigment particles to the room temperature, and the dispersion liquid was collected from the collecting port 15b.

The fine pigment particles as measured by a dynamic light scattering apparatus (DLS-7000, manufactured by Otsuka Electronics Co.), had an average particle size of 35 nm, and a particle size range of from 20 to 60 nm, thus the distribution was narrow.

As to the dispersion stability, when the dispersion liquid was left standing at the room temperature and subjected to the observation of agglomeration and precipitation of the particles, no precipitation was observed even after left standing for one month.

Preparation of Photosensitive Member Sample

From the dispersion liquid of the fine pigment particles, excessive titanyl phthalocyanine octasulfonic acid that was not involved in the formation of the fine pigment particles was removed with a dialysis membrane, and the fine pigment particles were collected by filtration and dried.

The dialysis membrane was Molecular Porous Membrane Tubing (MWCO: 3500), manufactured by SPECTRUM Laboratories Inc.

Then an undercoat layer having a thickness of about 1 μm was applied on an aluminum-evaporated Mylar.

Next, a liquid prepared by dispersing the fine pigment particles and a butyral resin in n-butyl acetate by an ultrasonic dispersing machine under cooling with ice, was applied on the undercoat layer and dried to form a charge generation layer having a thickness of about 0.2 μm.

Then a solution prepared by dissolving a triphenylamine compound and a polycarbonate resin in dichloromethane, was applied to form a charge transport layer having a thickness of about 25 μm. Through the above procedures, a sample of a function-separated photosensitive member was prepared.

Evaluation of Photoelectric Characteristics

The surface of the sample of the function-separated photosensitive member was subjected to corona charging for 20 seconds, and, after a dark attenuation for 20 seconds, was exposed to monochromatic light of 780 nm, and the absolute surface potential was measured during that time period.

As a result, the surface potential after the charging for 20 seconds exceeded 800 V and was identified as sufficient for practical use. However the charge loss was large during the dark attenuation for 20 seconds, and the presence of the dispersant as an impurity in the charge generation layer is considered to be causative of a decrease in resistance of the photosensitive layer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-070003, filed Mar. 14, 2006, which is hereby incorporated by reference herein in its entirety.

What is claimed is:

1. A method for producing a liquid composition containing pigment particles, the method comprising:
   (1) maintaining a mixture of a solvent and pigments of at least two types including a pigment A insoluble in the solvent at a normal temperature and a normal pressure (wherein the normal temperature means 25±15° C. and the normal pressure means $1.01325 \times 10^5 \pm 0.01333 \times 10^5$ Pa) and a pigment B soluble in the solvent at the normal temperature and the normal pressure, at a temperature and a pressure of a super-critical state, thereby obtaining a pigment solution in which the pigment A and the pigment B are dissolved; and
   (2) cooling the pigment solution to a temperature precipitating the pigment A or lower, thereby precipitating pigment particles containing the pigment A and the pigment B.

2. A method for producing a liquid composition containing pigment particles, the method comprising:
   (1) maintaining a mixture of a solvent and a pigment A insoluble in the solvent at a normal temperature and a normal pressure (wherein the normal temperature means 25±15° C. and the normal pressure means $1.01325 \times 10^5 \pm 0.01333 \times 10^5$ Pa) at a temperature and a pressure of a super-critical state, thereby obtaining a pigment solution A in which the pigment A is dissolved;

(2) dissolving a pigment B soluble in the solvent at the normal temperature and the normal pressure in the solvent, thereby obtaining a pigment solution B; and (3) contacting the pigment solution A and the pigment solution B, thereby precipitating pigment particles containing the pigment A and the pigment B.

3. A method for producing the liquid composition according to claim 1 or 2, wherein the solvent is either one of water or an aqueous solution containing water.

4. A method for producing the liquid composition according to claim 1 or 2, wherein the pigment A insoluble in the solvent at the normal temperature and the normal pressure is a metal phthalocyanine pigment represented by the following general formula (1):

$$MPc-(R)_n \tag{1}$$

wherein Pc represents a phthalocyanine ring; M represents a metal atom; R represents a substituent(s) of one type or two or more types different in their chemical structures; and n represents an integer of from 0 to 16.

5. A method for producing the liquid composition according to claim 1 or 2, wherein the pigment B soluble in the solvent at the normal temperature and the normal pressure is a metal phthalocyanine pigment represented by a general formula (2):

$$MPc-(R')_{n1} \tag{2}$$

wherein Pc represents a phthalocyanine ring; M represents a metal atom; R' represents a substituent(s) of one type or two or more types different in their chemical structures, in which at least one of the substituents is a hydrophilic substituent; and n1 represents an integer of from 1 to 16.

6. A method for producing pigment particles which comprises removing a solvent from a liquid composition containing pigment particles produced by the method according to claim 1 or 2.

* * * * *